(12) United States Patent
Gueron et al.

(10) Patent No.: US 9,383,966 B2
(45) Date of Patent: Jul. 5, 2016

(54) NUMBER SQUARING COMPUTER-IMPLEMENTED METHOD AND APPARATUS

(75) Inventors: Shay Gueron, Haifa (IL); Vlad Krasnov, Nesher (IL)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 13/996,512

(22) PCT Filed: Sep. 6, 2011

(86) PCT No.: PCT/US2011/050496
§ 371 (c)(1),
(2), (4) Date: Jun. 20, 2013

(87) PCT Pub. No.: WO2013/036217
PCT Pub. Date: Mar. 14, 2013

(65) Prior Publication Data
US 2013/0297664 A1    Nov. 7, 2013

(51) Int. Cl.
*G06F 7/552*     (2006.01)
*G06F 5/01*      (2006.01)
*H04L 9/30*      (2006.01)

(52) U.S. Cl.
CPC *G06F 5/01* (2013.01); *G06F 7/552* (2013.01); *H04L 9/302* (2013.01); *G06F 2207/5523* (2013.01); *H04L 2209/12* (2013.01); *H04L 2209/80* (2013.01)

(58) Field of Classification Search
CPC ....................................................... G06F 7/552
USPC ........................................................ 708/606
See application file for complete search history.

(56) References Cited

U.S. PATENT DOCUMENTS

| | | | |
|---|---|---|---|
| 6,032,169 A | 2/2000 | Malzahn et al. | |
| 2001/0018699 A1* | 8/2001 | Amer | 708/606 |
| 2002/0010730 A1 | 1/2002 | Blaker et al. | |
| 2003/0016822 A1* | 1/2003 | Dent et al. | 380/46 |
| 2006/0269054 A1 | 11/2006 | Dror et al. | |

FOREIGN PATENT DOCUMENTS

JP    S52 149454 A    12/1977

OTHER PUBLICATIONS

International Search Report and Written Opinion mailed Mar. 14, 2012 for International Application No. PCT/US2011/050496, 10 pages.
Extended European Search Report mailed May 7, 2015 for European Application No. 11872032.5, 7 pages.
Office Action mailed May 28, 2015 for Chinese Application No. 201180073287.5, 14 pages.
Office Action mailed Jan. 18, 2016 for Chinese Patent Application No. 201180073287.5, 6 pages.

* cited by examiner

*Primary Examiner* — Chuong D Ngo
(74) *Attorney, Agent, or Firm* — Schwabe, Williamson & Wyatt, P.C.

(57) ABSTRACT

Embodiments of the present disclosure describe computer-implemented methods, computer-readable media and computer system associated with big number squaring. A computer-implemented method to square a number x may include storing a t-digit vector representation of x in t b-bit registers of a processor. A 2t-digit intermediate vector may be generated and stored in 2t b-bit registers of the processor, using x stored in said t b-bit registers. A value stored in at least one of the t b-bit or 2t b-bit registers may be shifted to the left by n. n may be an integer at least equal to 1. At some point after the shifting, w, square of the number x, may be represented by the 2t-digit result vector stored in the 2t b-bit registers. Other embodiments may be described and/or claimed.

13 Claims, 4 Drawing Sheets

| Algorithm 1 Snippet | Algorithm 2 Snippet |
|---|---|
| ```
xor %r11, %r11
mov 24(%rsi), %rax
mulq 120(%rsi)
add %rax, %r9
adc %rdx, %r10
adc $0, %r11
add %rax, %r9
adc %rdx, %r10
adc $0, %r11
mov 32(%rsi), %rax
mulq 112(%rsi)
add %rax, %r9
adc %rdx, %r10
adc $0, %r11
add %rax, %r9
adc %rdx, %r10
adc $0, %r11
mov 40(%rsi), %rax
mulq 104(%rsi)
add %rax, %r9
adc %rdx, %r10
adc $0, %r11
add %rax, %r9
adc %rdx, %r10
adc $0, %r11
mov 48(%rsi), %rax
mulq 96(%rsi)
add %rax, %r9
adc %rdx, %r10
adc $0, %r11
add %rax, %r9
adc %rdx, %r10
adc $0, %r11
mov 56(%rsi), %rax
mulq 88(%rsi)
add %rax, %r9
adc %rdx, %r10
adc $0, %r11
add %rax, %r9
adc %rdx, %r10
adc $0, %r11
mov 64(%rsi), %rax
mulq 80(%rsi)
add %rax, %r9
adc %rdx, %r10
adc $0, %r11
add %rax, %r9
adc %rdx, %r10
adc $0, %r11
mov 72(%rsi), %rax
mulq 72(%rsi)
add %rax, %r9
adc %rdx, %r10
adc $0, %r11
mov %r9, 144(%rdi)
``` | ```
xor $r9, %r9
mov 24(%rsi), %rax
mulq 120(%rsi)
mov %rax, %r12
mov %rdx, %r13
xor %r14, %r14
mov 32(%rsi), %rax
mulq 112(%rsi)
add %rax, %r12
adc %rdx, %r13
adc $0, %r14
mov 40(%rsi), %rax
mulq 104(%rsi)
add %rax, %r12
adc %rdx, %r13
adc $0, %r14
mov 48(%rsi), %rax
mulq 96(%rsi)
add %rax, %r12
adc %rdx, %r13
adc $0, %r14
mov 56(%rsi), %rax
mulq 88(%rsi)
add %rax, %r12
adc %rdx, %r13
adc $0, %r14
mov 64(%rsi), %rax
mulq 80(%rsi)
add %rax, %r12
adc %rdx, %r13
adc $0, %r14
shld $1, %r13, %r14
shld $1, %r12, %r13
shl $1, %r12
add %r12, %r10
adc %r13, %r8
adc %r14, %r9
mov 72(%rsi), %rax
mulq 72(%rsi)
add %rax, %r10
adc %rdx, %r8
adc $0, %r9
mov %r10, 144(%rdi)
``` |

Fig. 2

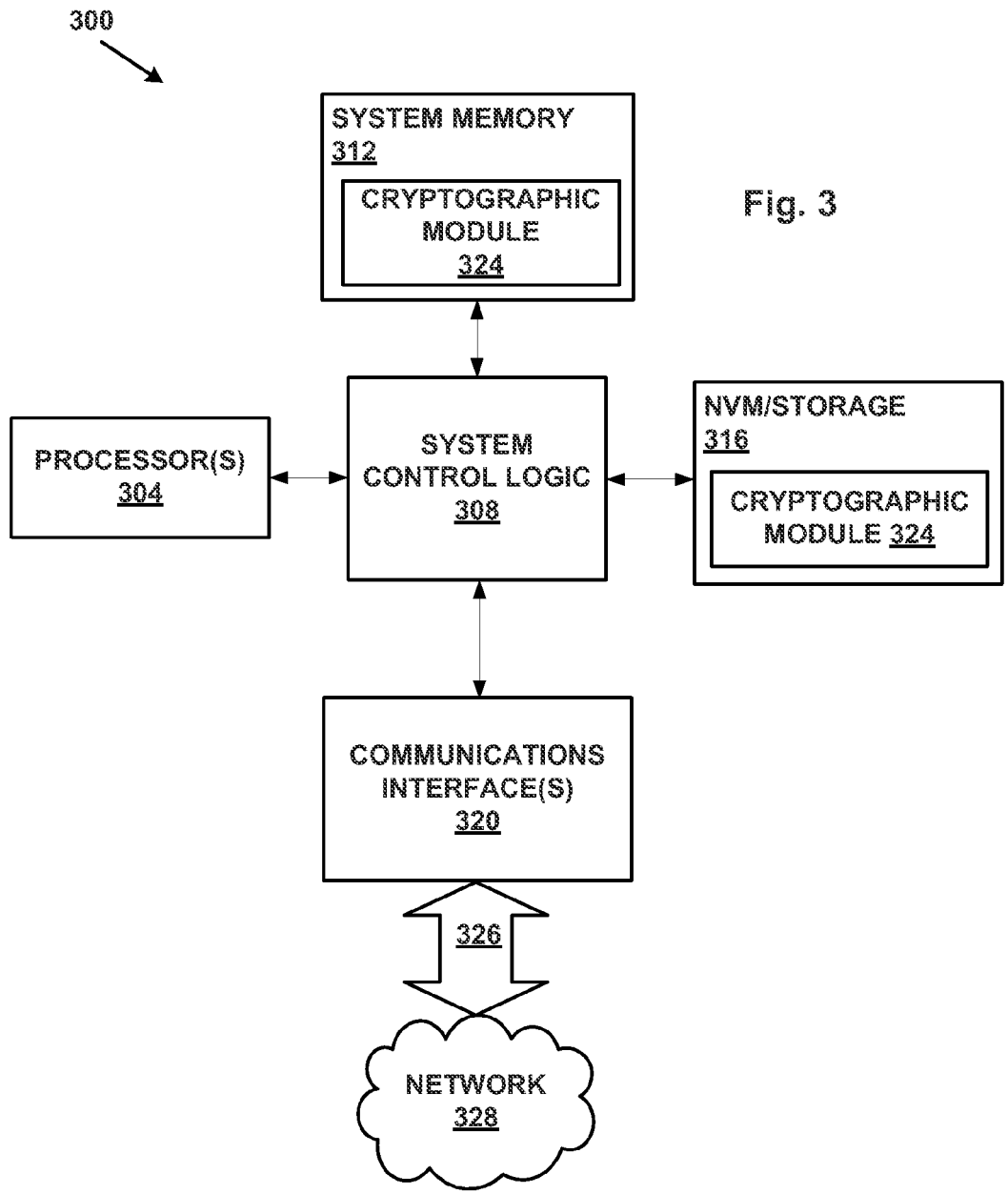

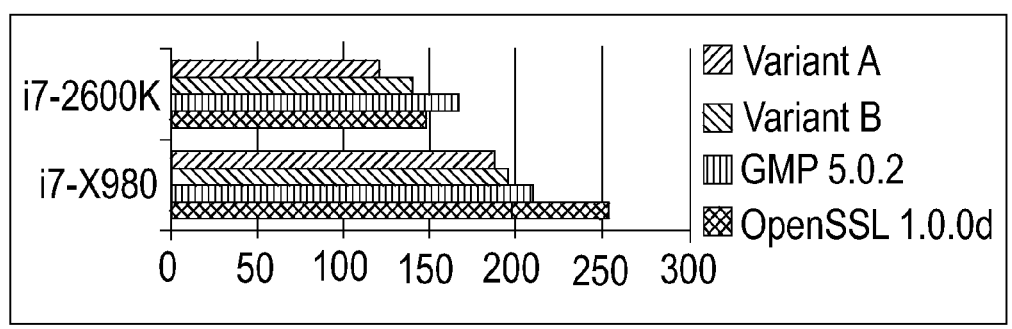
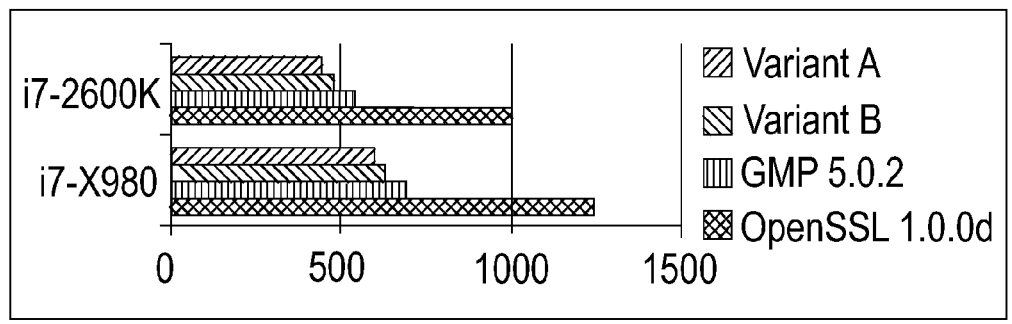
Fig. 4

NUMBER SQUARING COMPUTER-IMPLEMENTED METHOD AND APPARATUS

CROSS REFERENCE TO RELATED APPLICATIONS

The present application is a national phase entry under 35 U.S.C. §371 of International Application No. PCT/US11/050496, filed Sep. 6, 2011, entitled "NUMBER SQUARING COMPUTER-IMPLEMENTED METHOD AND APPARATUS", which designated, among the various States, the United States of America. The Specification of the PCT/US11/050496 Application is hereby incorporated by reference.

FIELD

Embodiments of the present invention relate generally to the field of data processing, and more particularly, to big number squaring associated with many cryptographic algorithms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Big number squaring may be an integral part of cryptographic operations. For example, the Rivest, Shamir and Adleman ("RSA") cryptographic algorithm may include two modular exponentiations. A w-ary modular exponentiation algorithm may include a loop that iterates through exponent bits in groups of w bits. In each iteration, w modular squaring operations may be performed, followed by a single modular multiplication operation. A modular squaring operation may include one big integer squaring, plus a number of smaller multiplications and additions that vary depending on the method used. A modular multiplication may include one big integer multiplication, plus several smaller multiplications and additions, again depending on the method used. In some cases the big integer squaring may typically involve integers of 8 or 16 digits, and may consume approximately 40% of the modular squaring operation. For example, with a window size of w=4 (four modular squaring operations per modular multiplication), approximately one third of the exponentiation time may be consumed by the big integer squaring. The relative weight of the big integer squaring operations may increase for larger windows sizes (e.g., w=5, w=6, and so forth).

A big number such as a big integer x may be represented on a computer by t b-bit digits. The number of bits b may be the number of bits in a word on a given architecture, and the number of digits t may be the number of words required to represent the number x. For example, on a 64-bit processor (e.g., x86-64 architecture), an 8-digit number has 512 total bits and a 16-digit number has 1024 bits. An example algorithm for squaring a big number is shown below:

| Algorithm 1 | |
|---|---|
| Input: | $x = x[0] + x[1] \times 2^b + x[2] \times 2^b \ldots + x[t-1] \times 2^{(t-1)b}$ |
| Output: | $w = w[0] + w[1] \times 2^b + w[2] \times 2^b \ldots + w[2t-1] \times 2^{(2t-1)b}$ |
| 1. | For i from 0 to (2t−1) do: w[i] = 0 |
| 2. | For i from 0 to (t−1) do: |
| 2.1 | $w[2i] = w[2i] + (x[i] \times x[i])_{low} + c$ |
| 2.2 | $w[2i+1] = w[2i+1] + (x[i] \times x[i])_{high} + \text{carry}$ |
| 2.3 | c = carry |
| 2.4 | For j from (i+1) to (t−1) do: |
| 2.4.1 | $w[i+j] = w[i+j] + (2 \times x[j] \times x[i])_{low} + u$ |
| 2.4.2 | $u = (2 \times x[j] \times x[i])_{high} + \text{carry};$ |
| 2.5 | w[i+t] = u |
| 3. | Return w |

In the above algorithm, carry may be a carry bit from a most recent add operation performed. c and u may be registers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 lists example operations that may be performed using two different algorithms to square big numbers, according to an embodiment of the disclosure.

FIG. 3 schematically depicts an example system configured to implement cryptographic operations and big number squaring, in accordance with an embodiment of the disclosure.

FIG. 4 illustrates example results, in accordance with various embodiments.

DETAILED DESCRIPTION

Figure 1:
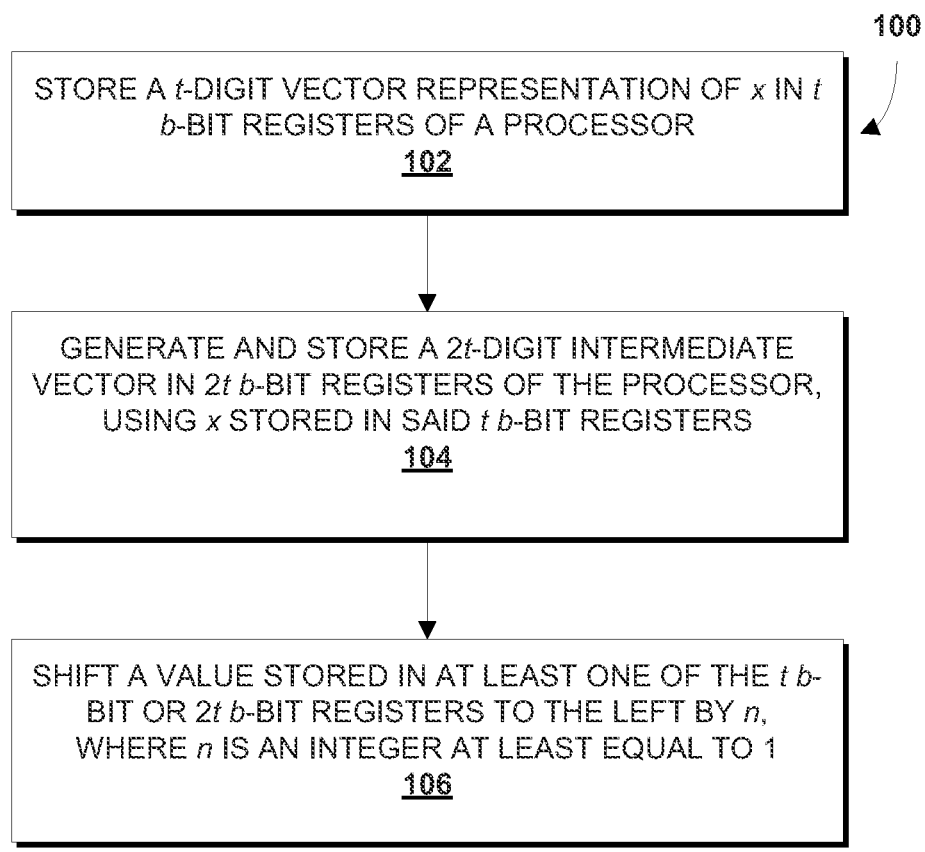
FIG. 1 schematically illustrates an example method for squaring big numbers, according to an embodiment of the disclosure.

In various embodiments, a computer implemented method may be provided to square a number x. The method may comprise storing a t-digit vector representation of x in t b-bit registers of a processor; generating and storing a 2t-digit intermediate vector in 2t b-bit registers of the processor, using x stored in said t b-bit registers; and shifting a value stored in at least one of the t b-bit or 2t b-bit registers to the left by n, where n is an integer at least equal to 1. w, square of the number x, may be represented by the 2t-digit result vector stored in the 2t b-bit registers after said shifting. In some embodiments, n=1.

In various embodiments, a system may comprise a processor, a communications channel coupled to the processor and a cryptographic module configured to be operated by the processor to encrypt messages for transmission on the channel and/or decrypt messages received on the channel. The cryptographic module may be configured to square a number x, represented as a t-digit vector, as part of an encryption or decryption. To square a number x, the cryptographic module may be configured to: store x in t b-bit registers of the processor; generate and store a 2t-digit intermediate vector in 2t b-bit registers of the processor, using x stored in said t b-bit registers; and shift a value stored in at least one of the t b-bit or 2t b-bit registers to the left by n, where n is an integer at least equal to 1. w, square of the number x, may be represented by the 2t-digit result vector stored in the 2t b-bit registers after the shift operation. In some embodiments, n=1.

In various embodiments, a non-transitory computer-readable medium having computer-readable code embodied therein is provided. The computer-readable code may comprise instructions configured to enable an apparatus, in response to execution of the instructions, to:

receive input of a number x to be squared, wherein x is stored in t b-bit memory locations, $x=x[0]+x[1]+x[2]+x[t-1]$;

allocate 2t b-bit memory locations, $w=w[0]+w[1]+w[2]+w[2t-1]$, to store x squared;

for each integer i with $0 \leq i \leq t-2$, perform the following operations:
  for each integer j with $(i+1) \leq j \leq (t-1)$ perform the following operations:
    set $w[i+j]=w[i+j]+(x[j] \times x[i])_{low}+u$;
    set $u=(x[j] \times x[i])_{high}+carry$;
  set $w[i+t]=u$;
set $w=w<<1$ for each integer i with $0 \leq i \leq t-1$, perform the following operations:
  set $w[2i]=w[2i]+(x[i] \times x[i])_{low}+c$;
  set $w[2i+1]=w[2i+1]+(x[i] \times x[i])_{high}+carry$;
  $c=carry$;

wherein carry is a carry bit from a most recent add operation performed, and c and u are registers.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation.

Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Algorithm 1 described in the background may exhibit the following characteristics, one or more of which may not be optimal. The product $x[j] \times x[i]$ may be computed using a multiplication ('mul') instruction at lines 2.4.1 and 2.4.2. The product may be represented by as many as 2b bits, and so the high and low bits may be stored in two separate b-bit registers (e.g., in the % rax and % rdx registers in an Intel x86-64 architecture processor, available from Intel Corp., of Santa Clara, Calif.). The low part of the product (e.g., stored in the % rax register) may be added to the variable u using an 'add' instruction at line 2.4.1. The high part of the product (e.g., stored in the % rdx register) may be added to the variable c using an add with carry usage ('adc') instruction at line 2.4.2. At line 2.3, the carry of the 'adc' instruction may be added to a third register, holding for instance, a value of zero, using the 'adc' instruction and an immediate value of zero. The addition of the low and high parts of the product (lines 2.4.1 and 2.4.2) may be repeated to accommodate for a multiplication by two. At line 2.4.1, u may be added to the value at array w[i+j] using the 'add' instruction. At line 2.4.2, carry may be added to c using the 'adc' instruction and an immediate value of zero; c may then be moved to u.

Algorithm 1 may be optimized in various ways. For example, some of the computations of Algorithm 1 may be split so that multiplications by two are deferred to the end. This may reduce a number of addition instructions (e.g., 'add' and/or 'adc') performed by nearly half.

FIG. 1 depicts an example method 100 of squaring a big number x, which may, for instance, be on the order $10^{308}$ (1024 bits) or larger. At 102, a t-digit vector representation of x, e.g., $x[0]+x[1] \times 2^b+x[2] \times 2^b \ldots +x[t-1] \times 2^{(t-1)b}$, may be stored in t b-bit registers of a processor. At 104, a 2t digit intermediate vector w, e.g., $w[0]+w[1] \times 2^b+w[2] \times 2^b \ldots +w[2t-1] \times 2^{(2t-1)b}$, may be generated using x stored in the t b-bit registers. w may be stored in 2t b-bit registers of the processor. At 106, a value stored in at least one of the t b-bit or 2t b-bit registers may be shifted to the left by n. In some embodiments, n may be an integer at least equal to 1. In some embodiments, 106 may be repeated until an entire vector is shifted. At some point after shifting at 106, e.g., after additional instructions (not shown) are executed in some embodiments, a square of x may be represented by the 2t-digit result vector stored in the 2t b-bit registers.

An example algorithm that may be implemented according to the method 100 of FIG. 1 is shown below in Algorithm 2. As above, c, u and s may be variable/values stored in respective registers of a processor.

Algorithm 2

| | |
|---|---|
| Input: | $x = x[0] + x[1] \times 2^b + x[2] \times 2^b \ldots + x[t-1] \times 2^{(t-1)b}$ |
| Output: | $w = w[0] + w[1] \times 2^b + w[2] \times 2^b \ldots + w[2t-1] \times 2^{(2t-1)b}$ |
| 1. | For i from 0 to (2t−1) do: w[i] = 0; |
| 2. | For i from 0 to (t−2) do: |
| 2.4 | For j from (i+1) to (t−1) do: |
| 2.4.1 | $w[i+j] = w[i+j] + (x[j] \times x[i])_{low} + u$; |
| 2.4.2 | $u = (x[j] \times x[i])_{high} + carry$; |
| 2.5 | w[i+t] = u; |
| 3. | w = w<<1; |
| 4. | For i from 0 to (t−1) do: |
| 4.1 | $w[2i] = w[2i] + (x[i] \times x[i])_{low} + c$; |
| 4.2 | $w[2i+1] = w[2i+1] + (x[i] \times x[i])_{high} + carry$; |
| 4.3 | c = carry; |
| 5. | Return w; |

Rather than repeatedly multiplying by two, as is done in Algorithm 1, at line 3 Algorithm 2 includes an instruction that shifts an entire vector left by 1. This shifting may be implemented in various ways. In some embodiments, shifting a value stored in at least one of the t b-bit or 2t b-bit registers to the left by n includes executing a double precision shift left ("shld") instruction, to shift a value stored in at least one of the t b-bit or 2t b-bit registers to the left by n. For example, in the Intel x-86 64-bit architecture, the shld instruction, shld(reg1, reg2, imm8), may shift reg1 left by imm8 (immediate or constant value) bits, while shifting bits from reg2 imm8 bits from the right.

In other embodiments, shifting a value stored in at least one of the t b-bit or 2t b-bit registers to the left by n includes executing a rotate with carry left ("rcl") instruction. This may shift a value stored in at least one of the t b-bit or 2t b-bit registers to the left by n. For example, the 'rcl' instruction may be repeated on the vector from the least significant word upwards, using an immediate value of 1. In other embodiments, SIMD instructions may be used for shifting.

FIG. 2 depicts example excerpts of assembly language instructions performed using Algorithm 1 and Algorithm 2, respectively, in accordance with various embodiments. As shown in FIG. 2, the number of instructions executed using Algorithm 2 is less than the number of instructions executed using Algorithm 1.

Algorithms 1 and 2 were tested on second generation Intel® Core processors. To square a 512-bit integer, Algorithm 2 used 144 central processing unit ("CPU") cycles, whereas Algorithm 1 used 193 CPU cycles, a savings of approximately 25%. To square a 1024-bit integer, Algorithm 2 used 562 CPU cycles, whereas Algorithm 1 used 838 CPU cycles, a savings of approximately 33%.

The techniques and apparatuses described herein may be implemented into a system using suitable hardware and/or software to configure as desired. FIG. 3 illustrates, for one embodiment, an example system 300 comprising one or more processor(s) 304, system control logic 308 coupled to at least one of the processor(s) 304, system memory 312 coupled to system control logic 308, non-volatile memory (NVM)/storage 316 coupled to system control logic 308, and one or more communications interface(s) 320 coupled to system control logic 308.

System control logic 308 for one embodiment may include any suitable interface controllers to provide for any suitable interface to at least one of the processor(s) 304 and/or to any suitable device or component in communication with system control logic 308.

System control logic 308 for one embodiment may include one or more memory controller(s) to provide an interface to system memory 312. System memory 312 may be used to load and store data and/or instructions, for example, for system 300. System memory 312 for one embodiment may include any suitable volatile memory, such as suitable dynamic random access memory (DRAM), for example.

System control logic 308 for one embodiment may include one or more input/output (I/O) controller(s) to provide an interface to NVM/storage 316 and communications interface(s) 320.

NVM/storage 316 may be used to store data and/or instructions, for example. NVM/storage 316 may include any suitable non-volatile memory, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s) for example.

The NVM/storage 316 may include a storage resource physically part of a device on which the system 300 is installed or it may be accessible by, but not necessarily a part of, the device. For example, the NVM/storage 316 may be accessed over a network via the communications interface(s) 320.

Communications interface(s) 320 may provide an interface for system 300 to communicate over a communication channel 326 with one or more network(s) 328 and/or with any other suitable device. Communications interface(s) 320 may include any suitable hardware and/or firmware. Communications interface(s) 320 for one embodiment may include, for example, a wireless network adapter. The communications interface(s) 320 may use one or more antenna(s).

System memory 312 and NVM/storage 316 may include temporal and persistent copies of a cryptographic module 324, respectively. The cryptographic module 324 may include instructions that when executed by at least one of the processor(s) 304 result in the system 300 performing cryptographic operations such as RSA. In some embodiments, the cryptographic module 324 may additionally/alternatively be located in the system control logic 308.

In particular, the cryptographic module 324 may configured to be operated by at least one of the processor(s) 304 to encrypt messages for transmission on the channel 326 and/or decrypt messages received on the channel 328. As part of these cryptographic operations, cryptographic module may be configured to perform big number squaring using various methods, such as those described herein.

For one embodiment, at least one of the processor(s) 304 may be packaged together with logic for one or more controller(s) of system control logic 308. For one embodiment, at least one of the processor(s) 304 may be packaged together with logic for one or more controllers of system control logic 308 to form a System in Package (SiP). For one embodiment, at least one of the processor(s) 304 may be integrated on the same die with logic for one or more controller(s) of system control logic 308. For one embodiment, at least one of the processor(s) 304 may be integrated on the same die with logic for one or more controller(s) of system control logic 308 to form a System on Chip (SoC).

The system 300 may be a desktop or laptop computer, a mobile telephone, a smart phone, or any other device adapted to receive a wireless communication signal. In various embodiments, system 300 may have more or less components, and/or different architectures.

Another example algorithm that may be implemented according to the method 100 of FIG. 1 is shown below in Algorithm 3. As above, c u and v may be variable/values stored in respective registers of a processor.

| Algorithm 3 | |
| --- | --- |
| Input: | $x = x[0] + x[1] \times 2^b + x[2] \times 2^b \ldots + x[t-1] \times 2^{(t-1)b}$ |
| Output: | $w = w[0] + w[1] \times 2^b + w[2] \times 2^b \ldots + w[2t-1] \times 2^{(2t-1)b}$ |
| 1. | For i from 0 to (2t−1) do: w[i] = 0; |
| 2. | For i from 2 to (t−1) do: $y[i] = (x[i] \ll 1) \oplus (x[i-1] \gg (b-1))$; |
| 3. | For i from 0 to (t−1) do: |
| 3.1. | $w[2i] = w[2i] + (x[i] \times x[i])_{low}$; |
| 3.2. | $c = (x[i] \times x[i])_{high} + carry$; |
| 3.3. | $w[2i+1] = w[2i+1] + c + ((x[i+1] \ll 1) \times x[i])_{low}$; |
| 3.4. | $c = ((x[i+1] \ll 1) \times x[i])_{low} + carry$; |
| 3.7. | For j from (i+2) to (t−1) do: |
| | 3.7.1. $w[i+j] = w[i+j] + (y[j] \times x[i])_{low} + c$; |
| | 3.7.2. $c = (y[j] \times x[i])_{lhigh} + carry$; |
| 3.8. | w[i+t] = c; |
| 4. | c = 0; |
| 5. | if $x[t-1] \gg (b-1) = 1$ do: |
| 5.1. | For j from 0 to (t−2) do: |
| | 5.1.1. w[t+j] = w[t+j] + x[i] + c; |
| | 5.1.3 c = carry; |
| 5.2 | w[2t−1] = w[2t−1] + c; |
| 6. | return w. |

Similar to algorithm 2, algorithm 3 may also save multiplications by 2. It also may only include half as many shift instructions as algorithm 2. However, some information may be lost by the shift left. Accordingly, step 4 may accommodate for this possibility.

FIG. 4 illustrates example results, in accordance with various embodiments, of using Algorithm 2 (referred to as "Variant A" in FIG. 4) and Algorithm 3 (referred to as "Variant B" in FIG. 4) to perform 512-bit and 1024-bit multiplications. In these test, x86-64 inline assembly instructions were used, though other types of instructions may be used. The performance was compared to performance of an optimized OpenSSL 1.0.0d function, bn_sqr_comba8, which is an assembly language function specifically optimized for 512-bit number squaring. Also compared is the BN sq function for 1024-bit multiplication. The performance of algorithms 2 and 3 was also compared to the GMP 5.0.2 function, gmpn_sqr_basecase, an assembly function specifically targeting Intel® Core processors. The performances were measured on Intel® Core™ and on $2^{nd}$ Generation Intel® Core™ processors. A square function in a loop with 100,000 repetitions was used. The average time it took to calculate a square was determined. The process was repeated 5,000 times.

The top chart of FIG. 4 illustrates example results for the 512-bit multiplication tests. The bars represent CPU cycles. The less cycles required, the faster the algorithm. Algorithm 2 may be the fastest on both processors, achieving a 10.5% increase in speed on a Previous Generation Intel® Core™ CPU (i7-X980), and more than an 18% increase in speed on a 2nd Generation Intel® Core™ CPU (i7-2600K) for both sizes.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A computer implemented method for transmitting encrypted messages from a computing device comprising a cryptographic module operating on a processor of the computing device, the method comprising:

receiving, by the cryptographic module, a message for encryption;

encrypting, by the cryptographic module, the message, the encrypting including:

for a number x, storing, by the cryptographic module, a t-digit vector representation of x in t b-bit registers of the processor, wherein the t b-bit registers are represented by $x=x[0]+x[1]\times 2^b+x[2]\times 2^{2b} \ldots +x[t-1]\times 2^{(t-1)b}$;

generating and storing, by the cryptographic module, a 2t-digit intermediate vector in 2t b-bit registers of the processor, using x stored in said t b-bit registers, wherein the 2t b-bit registers are represented by $w=w[0]+w[1]\times 2^b+w[2]\times 2^{2b} \ldots +w[2t-1]\times 2^{(2t-1)b}$;

shifting, by the cryptographic module, a value stored in the t b-bit registers, the 2t b-bit registers, or both, to the left by n, where n is an integer at least equal to 1; and wherein generating and storing and shifting include:

for each integer i with $0\leq i\leq(t-2)$, performing, by the processor, the following operations:

for each integer j with $(i+1)\leq j\leq(t-1)$ do:

set $w[i+j]=w[i+j]+(x[j]\times x[i])_{low}+u$; and set $u=(x[j]\times x[i])_{high}+$carry; and set $w[i+t]=u$;

setting $w=w\ll 1$;

for each integer i with $0\leq i\leq(t-1)$, performing, by the processor, the following operations:

set $w[2i]=w[2i]+(x[i]\times x[i])_{low}+c$;

set $w[2i+1]=w[2i+1]+(x[i]\times x[i])_{high}+$carry; and set $c=$carry; and returning a value stored in w as a square of the number x; and transmitting, using a communications channel of the computing device, the encrypted message from the computing device to another computing device;

wherein:

w, square of the number x, is represented by the 2t-digit result vector stored in the 2t b-bit registers, and t and b are integers; and carry is a carry bit from a most recent add operation performed by the processor, and u is a register.

2. The computer-implemented method of claim 1, wherein shifting a value stored in at least one of the t b-bit or 2t b-bit registers to the left by n comprises executing a double precision shift left ("shld") instruction, to shift a value stored in at least one of the 2t b-bit registers to the left by n.

3. The computer-implemented method of claim 1, wherein shifting a value stored in at least one of the t b-bit or 2t b-bit registers to the left by n comprises executing a rotate with carry left ("rcl") instruction, to shift a value stored in at least one of the 2t b-bit registers to the left by n.

4. The computer-implemented method of claim 1, wherein n=1.

5. A system comprising:

a processor;

a communications channel coupled to the processor;

a cryptographic module configured to be operated by the processor to encrypt messages for transmission on the channel and/or decrypt messages received on the channel, wherein the cryptographic module is configured to square a number x, represented as a t-digit vector, as part of an encryption or decryption, wherein to square a number x, the cryptographic module is configured to:

store x in t b-bit registers of the processor, wherein the t b-bit registers are represented by $x=x[0]+x[1]\times 2^b+x[2]\times 2^{2b} \ldots +x[t-1]\times 2^{(t-1)b}$;

generate and store a 2t-digit intermediate vector in 2t b-bit registers of the processor, using x stored in said t b-bit registers, wherein the 2t b-bit registers are represented by $w=w[0]+w[1]\times 2^b+w[2]\times 2^{2b} \ldots +w[2t-1]\times 2^{(2t-1)b}$;

shift a value stored in the t b-bit registers, the 2t b-bit registers, or both, to the left by n, where n is an integer at least equal to 1; and wherein said generate and store and shift include:

for each integer i with $2\leq i\leq(t-1)$, perform set $y[i]=(x[i]\ll 1)\oplus(x[i-1]\gg(b-1))$;

for each integer i with $0\leq i\leq(t-1)$, perform the following operations:

set $w[2i]=w[2i]+(x[i]\times x[i])_{low}$;

set $c=(x[i]\times x[i])_{high}+$carry;

set $w[2i+1]=w[2i+1]+c+((x[i+1]\ll 1)\times x[i])_{low}$;

set $c=((x[i+1]\ll 1)\times x[i])_{low}+$carry;

for each integer j with $(i+2)\leq j\leq(t-1)$:

set $w[i+j]=w[i+j]+(y[j]\times x[i])_{low}+c$;

set $c=(y[j]\times x[i])_{high}+$carry;

set $w[i+t]=c$;

set c=0, wherein c is a register;

when $x[t-1]\gg(b-1)=1$ do:

for each integer j with $0\leq j\leq(t-2)$:

set w[t+j]=w[t+j]+x[i]+c;
set c=carry;
set w[2t−1]=w[2t−1]+c; and
return a value stored in w as a square of the number x;
wherein w, square of the number x, is represented by the 2t-digit result vector stored in the 2t b-bit registers, y is a temporary vector, and t and b are integers.

6. The system of claim 5, wherein to shift a value stored in at least one of the t b-bit or 2t b-bit registers to the left by n, the cryptographic module is configured to execute a double precision shift left ("shld") instruction, to shift a value stored in at least one of the t b-bit or 2t b-bit registers to the left by n.

7. The system of claim 5, wherein to shift a value stored in at least one of the t b-bit or 2t b-bit registers to the left by n, the cryptographic module is configured to execute a rotate with carry left ("rcl") instruction, to shift a value stored in at least one of the t b-bit or 2t b-bit registers to the left by n.

8. The system of claim 5, wherein n=1.

9. A non-transitory computer-readable medium having computer-readable code embodied therein, the computer-readable code comprising instructions configured to enable an apparatus, in response to execution of the instructions, to:
receive a message for encryption;
encrypt the message, the encrypt including:
  receive input of a number x to be squared, wherein x is stored in t b-bit memory locations, $x=x[0]+x[1]\times2^b+x[2]\times2^{2b} \ldots +x[t-1]\times2^{(t-1)b}$, wherein t is an integer;
  allocate 2t b-bit memory locations, $w=w[0]+w[1]\times2^b+w[2]\times2^{2b} \ldots +w[2t-1]\times2^{(2t-1)b}$, to store x squared, wherein b is an integer;
  for each integer i with $0\leq i\leq(t-2)$, perform the following operations:
    for each integer j with $(i+1)\leq j\leq(t-1)$ perform the following operations:
      set $w[i+j]=w[i+j]+(x[j]\times x[i])_{low}+u$;
      set $u=(x[j]\times x[i])_{high}+carry$; and
    set w[i+t]=u;
  set w=w<<1;
  for each integer i with $0\leq i\leq(t-1)$, perform the following operations:
    set $w[2i]=w[2i]+(x[i]\times x[i])_{low}+c$;
    $w[2i+1]=w[2i+1]+(x[i]\times x[i])_{high}+carry$; and
    set c=carry; and
  return a value stored in w as a square of the number x; and
transmit, using a communications channel of the apparatus, the encrypted message from the apparatus to another apparatus; and
wherein carry is a carry bit from a most recent add operation performed, and u is a register, and wherein w, square of the number x, is represented by the 2t b-bit memory locations.

10. A non-transitory computer-readable medium having computer-readable code embodied therein, the computer-readable code comprising instructions configured to enable an apparatus, in response to execution of the instructions, to:
receive a message for encryption;
encrypt the message, the encrypt including:
  receive input of a number x to be squared;
  store a t-digit vector representation of x in t b-bit registers of a processor, wherein the t b-bit registers are represented by $x=x[0]+x[1]\times2^b+x[2]\times2^{2b} \ldots +x[t-1]\times2^{(t-1)b}$;
  generate and storing a 2t-digit intermediate vector in 2t b-bit registers of the processor, using x stored in said t b-bit registers, wherein the 2t b-bit registers are represented by $w=w[0]+w[1]\times2^b+w[2]\times2^{2b} \ldots +w[2t-1]\times2^{(2t-1)b}$;
  shift a value stored in the t b-bit registers, the 2t b-bit registers, or both, to the left by n, where n is an integer at least equal to 1; and
  wherein said generate and store and shift include:
    for each integer i with $2\leq i\leq(t-1)$, perform set $y[i]=(x[i]<<1)\oplus(x[i-1]>>(b-1))$;
    for each integer i with $0\leq i\leq(t-1)$, perform the following operations:
      set $w[2i]=w[2i]+(x[i]\times x[i])_{low}$;
      set $c=(x[i]\times x[i])_{high}+carry$;
      set $w[2i+1]=w[2i+1]+c+((x[i+1]<<1)\times x[i])_{low}$;
      set $c=((x[i+1]<<1)\times x[i])_{low}+carry$;
      for each integer j with $(i+2)\leq j\leq(t-1)$:
        set $w[i+j]=w[i+j]+(y[j]\times x[i])_{low}+c$;
        set $c=(y[j]\times x[i])_{high}+carry$;
      set w[i+t]=c;
    set c=0, wherein c is a register;
    when x[t−1]>>(b−1)=1 do:
      for each integer j with $0\leq j\leq(t-2)$:
        set w[t+j]=w[t+j]+x[i]+c;
        set c=carry;
      set w[2t−1]=w[2t−1]+c;
  return a value stored in w as a square of the number x; and
transmit, using a communications channel of the apparatus, the encrypted message from the apparatus to another apparatus; and
wherein w, square of the number x, is represented by the 2t-digit result vector stored in the 2t b-bit registers, y is a temporary vector, and t and b are integers.

11. The non-transitory computer-readable medium of claim 10, wherein shifting a value stored in at least one of the t b-bit or 2t b-bit registers to the left by n comprises executing a double precision shift left ("shld") instruction, to shift a value stored in at least one of the 2t b-bit registers to the left by n.

12. The non-transitory computer-readable medium of claim 10, wherein shifting a value stored in at least one of the t b-bit or 2t b-bit registers to the left by n comprises executing a rotate with carry left ("rcl") instruction, to shift a value stored in at least one of the 2t b-bit registers to the left by n.

13. The non-transitory computer-readable medium of claim 10, wherein n=1.

* * * * *